United States Patent [19]

Nyberg

[11] Patent Number: 4,665,351

[45] Date of Patent: May 12, 1987

[54] WINDSHIELD WIPER CONTROL SYSTEM AND A PRECIPITATION SENSOR THEREFOR

[75] Inventor: Glen A. Nyberg, St. Clair Shores, Mich.

[73] Assignee: General Motors Corporation, Detroit, Mich.

[21] Appl. No.: 826,508

[22] Filed: Feb. 5, 1986

[51] Int. Cl.⁴ .................. B60S 1/08; H02P 3/00
[52] U.S. Cl. ........................ 318/483; 318/643; 318/DIG. 2; 15/250 C; 15/250.05; 200/61.05; 340/602
[58] Field of Search ............. 318/443, 444, 445, 483, 318/643, DIG. 2; 15/250 C, 250.02, 250.04, 250.13, 250.16, 250.17, 250.05, 250.12; 200/61.04, 61.05; 307/9, 10 R; 219/203, 509, 547; 73/73; 335/35; 340/602, 604

[56] References Cited

U.S. PATENT DOCUMENTS

| | | | |
|---|---|---|---|
| 2,668,202 | 2/1954 | Kaplan | 200/61.05 |
| 2,735,907 | 2/1956 | Inman | 200/61.05 |
| 3,127,485 | 3/1964 | Vitolo | 200/61.05 |
| 3,649,898 | 3/1972 | Inoue | 318/443 X |
| 3,983,527 | 9/1976 | Ohsato et al. | 200/61.04 X |
| 4,127,763 | 11/1978 | Roselli | 318/483 X |

Primary Examiner—Charles D. Miller
Assistant Examiner—Bentsu Ro
Attorney, Agent, or Firm—Warren D. Hill

[57] ABSTRACT

A precipitation sensor for detecting when a predetermined fraction of the sensor area is covered with water drops comprises an insulating substrate, a pair of spaced electrodes of conductive material on the substrate, and an array of conductive spots on the substrate between the electrodes, the spots being arranged to define an open circuit between the electrodes when the substrate is dry and a closed circuit when at least some of the spots are bridged by water drops. This sensor uses the physical principle of percolation to respond accurately to small amounts of precipitation and is preferably integrated in the wipe area of a windshield surface and is incorporated in the wiper control system.

11 Claims, 8 Drawing Figures

4,665,351

WINDSHIELD WIPER CONTROL SYSTEM AND A PRECIPITATION SENSOR THEREFOR

FIELD OF THE INVENTION

This invention relates to a system for controlling a windshield wiper and a precipitation sensor for actuating the system.

BACKGROUND OF THE INVENTION

It is known to automatically control windshield wipers on a vehicle by using a precipitation sensor coupled to a wiper system to actuate the system when rain or other water is detected. In some cases the sensor is on the windshield surface and wiped during wiper operation. Usually such sensors are resistive or capacitive. The effect of the water drops on the resistance or capacitance is a function of the purity of the water. For example, if a pair of interdigitated electrodes are bridged by a few drops of water the resistance across the electrodes is a linear function of the number of drops but also depends on the resistivity of the water. The resistivity may be quite high, in the case of relatively pure rain, or quite low in the case of rain or road spray containing salts so that the sensitivity may depend more on the resistivity than on the number of drops or amount of surface coverage. Thus a circuit sensitive to a given resistance across the electrodes may be actuated by much or little water depending on the water's characteristics, and thus cannot be calibrated for a given amount of water for consistent or repeatable operation. In addition, such sensors are insensitive to small amounts of water while proper wiper operation depends on detecting a very small percentage of water coverage on the windshield.

It is desired, however, to detect a given number of water drops in a sensor area or a given percentage of area coverage independently of water resistivity. Preferably the sensor is integrated into the windshield wiper system in a manner to respond to the conditions prevalent across the windshield.

SUMMARY OF THE INVENTION

It is therefore an object of the invention to provide a precipitation sensor responsive to small amounts of water on the sensor surface and relatively insensitive to the resistivity of the water.

It is a further object to provide a precipitation sensor for a windshield wiper control which is directly responsive to moisture on the wipe area of the windshield.

It is another object to provide a windshield wiper control system incorporating such a sensor.

The invention is carried out by a precipitation sensor for detecting when a predetermined portion of the sensor area is covered with water drops, comprising an insulating substrate, a pair of spaced electrodes of conductive material on the substrate, and an array of conductive spots on the substrate between the electrodes, the spots being arranged to define an open circuit between the electrodes when the substrate is dry and a closed circuit when at least some of the spots are bridged by water drops. The invention also comprehends such a sensor with a heater to cause evaporation of long standing moisture.

The invention is further carried out by a windshield wiper control system for actuating wipers to wipe a window area in response to precipitation on the window, comprising a precipitation sensor having a pair of spaced elongated electrodes of thin film transparent conductive material on the window area, the space between the electrodes comprising the sensor area, and an array of thin film transparent conductive spots on the window between the electrodes, the spots being arranged to define an open circuit between the electrodes when the window is dry and a closed circuit when at least some of the spots are bridged by water drops, and a wiper control circuit coupled to the precipitation sensor for actuating wipers when the circuit is closed to wipe the area covered by the

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
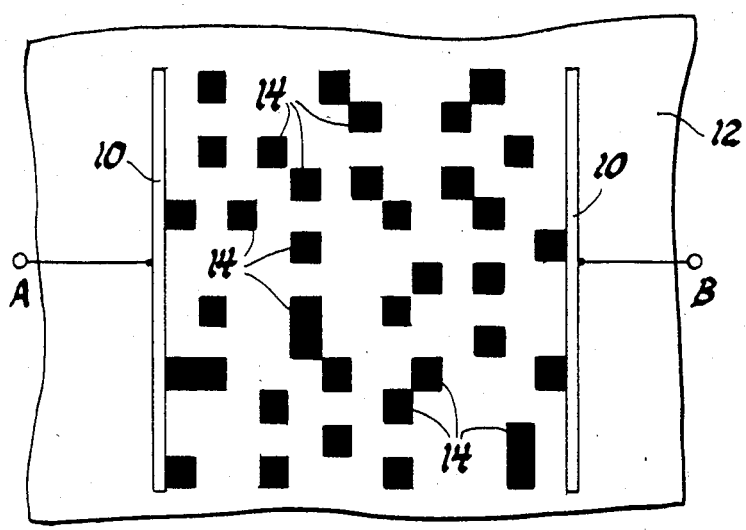
FIGS. 1 and 2 are diagrams illustrating two-dimensional percolation as embodied in the subject invention.
Figure 2:
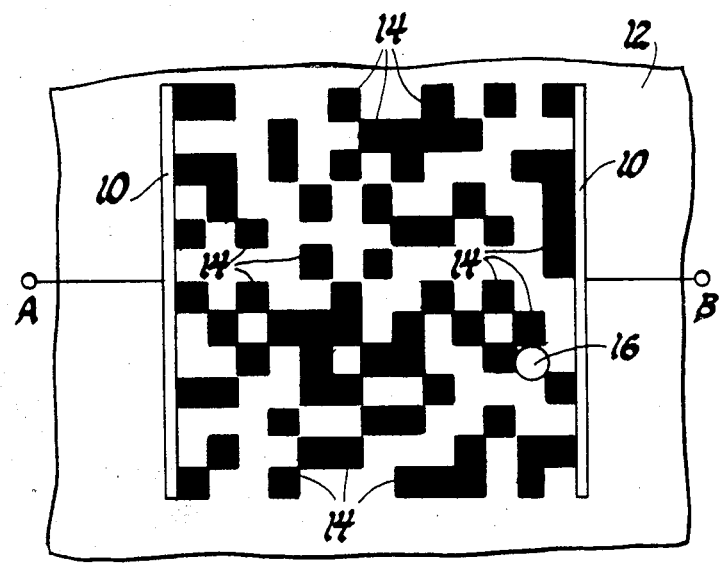

The precipitation sensor disclosed herein utilizes the two-dimensional percolation principle for its operation, thus taking advantage of the random distribution of rain drops or of water spray patterns. Generally defined, percolation is the rapid onset of conduction in a random mixture of conductors and insulators at a certain threshold mixture. This threshold occurs when the first conducting path traverses the entire sensor; immediately after this the conductance continues to rise sharply because the number of parallel conducting paths proliferates. This phenomenon, as related to this invention, is illustrated in FIGS. 1 and 2 where a pair of spaced elongated electrodes 10 on an insulating substrate 12 define a sensor area. If the sensor area is considered to be an imaginary 13×13 grid and a number of conductive drops 14, represented by black squares, are randomly located on the grid the resistance between the electrodes is infinite so long as the drops 14 do not form a complete chain to close the circuit. Black squares touching at their corners or sides are considered to be electrically connected. FIG. 1 contains 37 conductive squares and FIG. 2 contains 71 conductive squares but the resistance across the electrodes is infinite in each case. When one more drop 16, shown as a circle, is added to FIG. 2 a circuit path between the electrodes is completed. This point is called the percolation threshold which occurs at 42% coverage of the sensor area for the particular geometry of this example. The resistance of the path depends on the resistivity of the drops but as the coverage increases upon the addition of a few more drops, more paths in parallel are completed and the resistance between the electrodes decreases.

Figure 3:
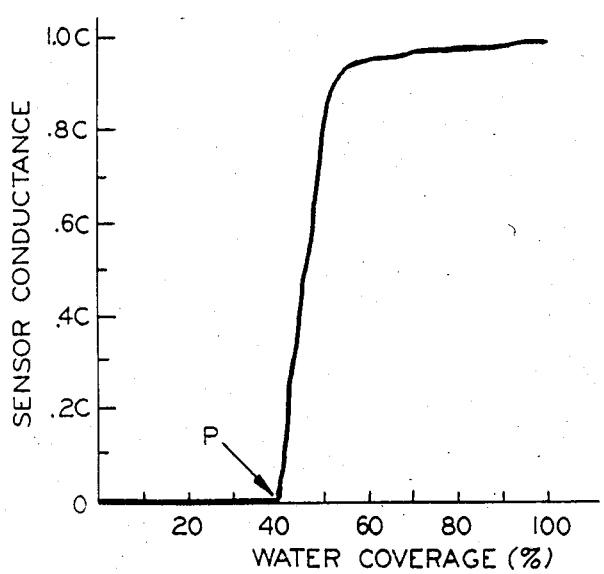
FIG. 3 is a graph illustrating the percolation threshold of the precipitation sensor according to the invention.

FIG. 3 discloses the conductance of the above sensor as a fraction of the conductance C at full coverage relative to the percentage of water coverage. The percolation threshold P at 42% coverage marks a significant increase in conductance which increases rapidly with increased coverage and reaches almost full value at about 50% coverage. This approximate step function simulates a switch operation. Such a sensor could be used to sense precipitation but it would be actuated only at water coverage above 42% of the sensor area, whereas a practical sensor for windshield wiper operation should be triggered at a much smaller value, preferably about 3%. To accomplish the sensitivity to low water coverage the sensor of FIG. 2 is modified by locating conductive pads on the substrate 12 in place of the black squares 14 representing drops. Thus the conductive pads serve as artificial water drops and only a few real water drops are needed to increase the apparent coverage to a value above the percolation threshold, thereby making the device very sensitive to small amounts of water. An additional advantage is that the conductive pads have a known resistivity and only the few water drops in the sensor path have a variable resistivity. As a result the resistance between the electrodes is highly dependent on the coverage of water drops and very slightly dependent on the water resistivity.

Figure 4:
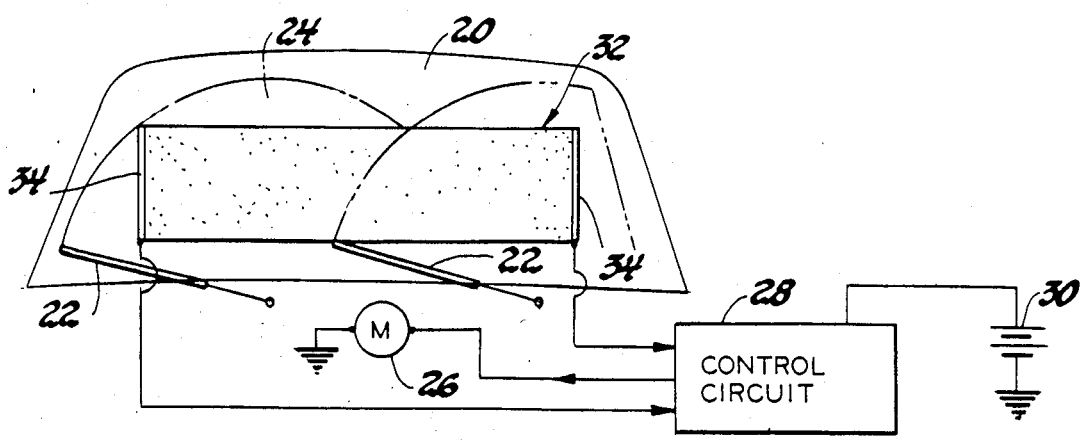
FIG. 4 is a schematic illustration of a windshield wiper control system according to the invention.
Figure 5:
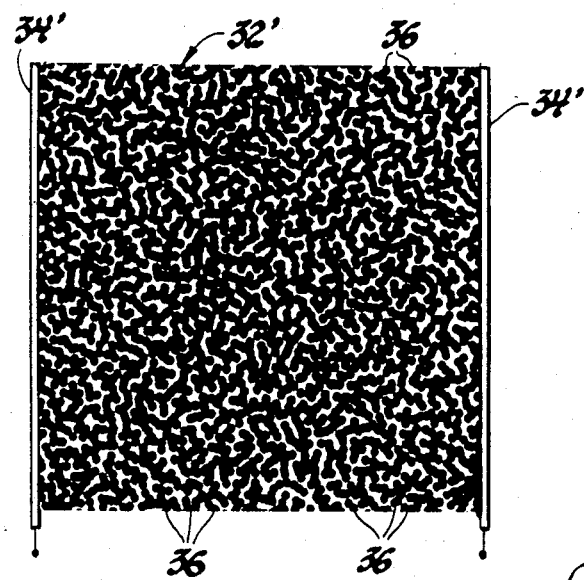
FIG. 5 is a view of a sensor showing a typical conductive sensor pattern.

A windshield wiper control system incorporating a sensor according to the invention is shown in FIG. 4. A windshield 20 wiped by a pair of wipers 22 has a wipe area 24 (outlined by broken lines). The wipers are driven by a motor 26 mechanically coupled to the wipers and actuated by a control circuit 28 which is energized by a vehicle battery 30. The control circuit 28 is the kind used with conventional manually switched controls with a sensor 32 substituted for the manual switch. A large precipitation sensor 32, say about one foot high and three feet long, is integrated with the windshield surface in the wipe area 24. The conductive pattern of the sensor 32 is formed of a transparent layer of fluorinated tin dioxide 700 angstroms thick deposited on the windshield glass. A pair of electrodes 34 forming opposite sides of the sensor are connected to the control circuit 28. As shown in the reduced size sensor 32' of FIG. 5 the space between the electrodes 34' contains an array of conductive spots 36, preferably round dots, in a pattern sufficiently dense to approach the percolation threshold yet maintaining an open circuit between the electrodes until some water drops fall on the sensor 32'. As a matter of design the pattern is chosen to allow a closed circuit to occur when the water drop coverage is in the range of 1% to 5%, with 3% being the optimum value. The pattern of spots covers about 55% of the sensor area. Due to the different patterns of the sensors of FIGS. 2 and 5, the percolation thresholds are also different.

The pseudo-randomly located spots 36 overlap to form chains having an average distance between the ends comparable to the average spacing between drops at the percolation threshold. While a random distribution of spots 36 is desirable, an ordered pattern of spots could be used to achieve essentially the same effect. The FIG. 5 pattern is random as to chain orientation and shape and represents a sensor three inches square comprised of 1.4 mm diameter dots. The spot size is optimal when it is the same size as the drops being sensed. This is not readily accomplished since there are many types of precipitation ranging from fine mist 0.5 mm in diameter to large rain drops up to 4 mm in diameter. A result of sensing drops of substantially different size than the spots 36 is a shifting of the percolation threshold due to the changing statistical chance of closing the open spaces between the chains.

Figure 6:
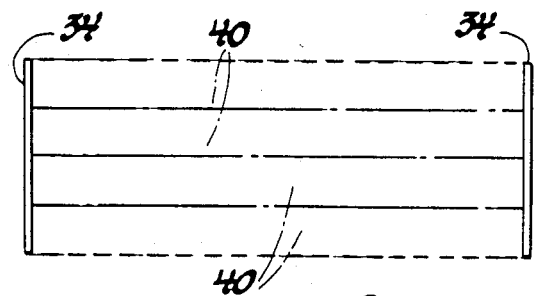
FIG. 6 is a view of a second embodiment of the precipitation sensor according to the invention.

A sensor embodiment for accommodating various drop sizes is shown in FIG. 6. There the space between the electrodes 34 is divided into four horizontal bands or strips 40, each having an array of conductive spots (not shown) of size different from the other strips. All spots within a certain band are the same size. The spot sizes for the four bands may be, for example, 0.5 mm, 1.5 mm, 2.5 mm, and 5 mm diameter. Then each band will reach its designed percolation threshold when subjected to drops near its spot size to achieve the optimum sensing point for a wide variety of precipitation conditions.

Figure 7:
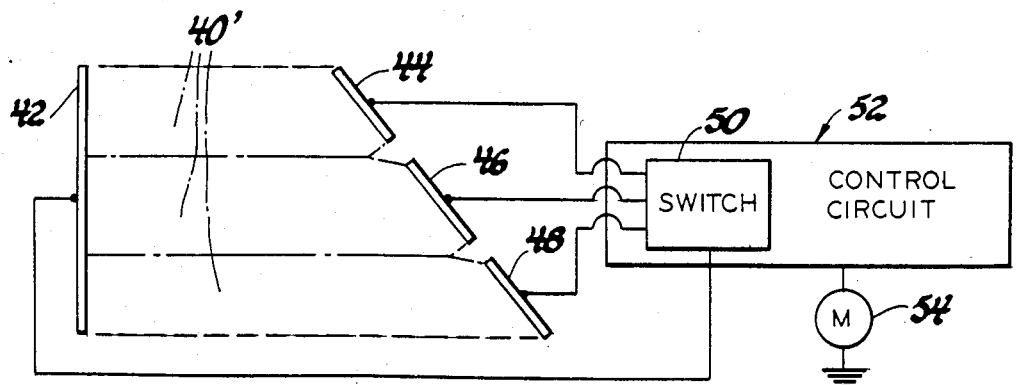
FIG. 7 is a schematic illustration of a third embodiment of the invention.

FIG. 7 reveals still another embodiment of the invention which allows operator selection of sensor sensitivity. There an electrode 42 on one side of the sensor is spaced from three electrodes 44, 46 and 48 on the other side which are arranged on a slant so that they define sensor regions having different size and shape spaces or bands 40' extending to electrode 42. The spaces contain an array of uniform size dots (not shown) as in FIG. 5. Because of the different geometries of the interelectrode spaces the percolation threshold will be different for each one so that the sensitivity of each sensor region is different from the others. Sensors having a larger length/width ratio have a higher percolation threshold. The electrodes are individually coupled to a manually controlled switch 50 which is a part of a control circuit 52. The control circuit 52 is connected to a wiper motor 54 for motor control. The switch 50 can select electrode 42 and any of the electrodes 44, 46 or 48 to determine system sensitivity thereby allowing the operator to choose the degree of precipitation to which the control will respond. It should be recognized that the electrode 42 does not have to be part of the selected region; the chosen electrodes may be 44 and 48, for example. Many other electrode arrangements and size distributions are possible.

It will be apparent that the invention described herein makes possible an inexpensive precipitation sensor which can be integrated into a windshield and used as a part of a wiper control circuit, and that the sensor statistically samples precipitation to control wipers at a low percentage of water coverage on the sensor area. Since the sensor can be large enough to cover a major portion of the wipe area it can respond to the actual condition of the wipe area rather than a simulation of the actual condition at a small sample region on or near the wiper area. The sensor is not limited to use on a windshield but can be applied to other wiped glass areas such as vehicle rear windows or headlamps equipped with wipers.

Another desirable form of the sensor having the advantages of large area and location in the wiping area while offering economy in manufacture comprises a thin coupon carrying the sensor pattern and affixed to the windshield surface. Specifically the coupon has a substrate of thin glass, preferably curved to accommodate windshield curvature. For example, the glass is four by six inches in area and 0.005 to 0.01 inch thick and is attached to the upper center of the windshield by a clear adhesive. The conductive sensor pattern is carried on the surface of the coupon in the form of a tin dioxide pattern as described above or it can be a conductive glass frit fused to the surface of the glass coupon. For coupling to a control system, conductive leads are conveniently extended from the sensor to the upper edge of the windshield. There the leads are connected to conductors concealed by the windshield trim.

Figure 8:
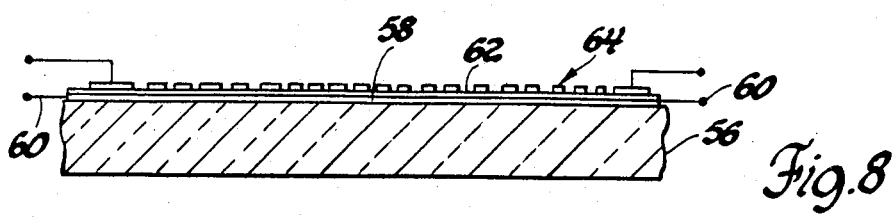
FIG. 8 is a cross-sectional view of a sensor according to a fourth embodiment of the invention.

The principles of the invention can also be applied to sensors located on non-wiped surfaces but some provision must be made to remove accumulated moisture after some time period so that the sensor can respond to current precipitation conditions. The embodiment shown in FIG. 8 uses a heater to gradually evaporate moisture. A substrate 56 of insulating material is covered over a sensor area with a resistive heater film 58 which is connected to conductors 60 for supplying heating current to the film 58. The film 58 is covered with a dielectric film or layer 62 which, in turn, supports the conductive sensor pattern 64 including electrodes and conductive spots as described above.

For control purposes, the current required to dry the sensor in a given period can be used as a measure of the precipitation rate for setting wiper frequency.

The embodiments of the invention in which an exclusive property or privilege is claimed are defined as follows:

1. A precipitation sensor for detecting when a predetermined fraction of the sensor area is covered with water drops, comprising
    an insulating substrate,
    a pair of spaced electrodes of conductive material on the substrate, and
    an array of conductive spots on the substrate between the electrodes, the spots being arranged in a two dimensional pattern to define a plurality of open circuit paths between the electrodes when the substrate is dry and at least one closed circuit path when some of the spots are bridged by water drops.

2. A precipitation sensor as claimed in claim 1 including means for heating the sensor to effect evaporation of moisture accumulated on the sensor so that only recent precipitation is effective to actuate the sensor, wherein the heating means comprises a heating film on the substrate in the sensing area and an insulating film separating the heating film from the conductive spots and electrodes.

3. A precipitation sensor for detecting when a predetermined fraction of the sensor area is covered with water drops, comprising
    a glass substrate,
    a pair of spaced elongated electrodes of thin film transparent conductive material on the substrate, the space between the electrodes comprising the sensor area, and
    an array of thin film transparent-conductive spots on the substrate between the electrodes, the spots being arranged in a two dimensional pattern to define a plurality of potential circuit paths between the electrodes when the substrate is dry and at least one closed circuit path when some of the spots are bridged by water drops.

4. A precipitation sensor as defined in claim 3 wherein the conductive spots have a size comparable to the water drops to be sensed, and the spots cover about half the sensor area.

5. A precipitation sensor as defined in claim 3 wherein the conductive spots cover sufficient sensor area that a circuit path is closed when one to five percent of the sensor area is covered by randomly spaced water drops.

6. A precipitation sensor as defined in claim 3 wherein the substrate is a thin coupon suitable for affixing to the surface of a windshield or other surface.

7. A windshield wiper control system for actuating wipers to wipe a window area in response to precipitation on the window, comprising;
    a precipitation sensor having a pair of spaced elongated electrodes of thin film transparent conductive material on the window area, the space between the electrodes comprising the sensor area, and a two dimensional array of thin film transparent conductive spots on the window between the electrodes, the spots being arranged to define a plurality of open circuit paths between the electrodes when the window is dry and at least one closed circuit path when some of the spots are bridged by water drops, and
    a wiper control circuit coupled to the precipitation sensor for actuating wipers when the circuit is closed to wipe the area covered by the sensor.

8. A windshield wiper control system as defined in claim 7 wherein the conductive spots have a size comparable to the water drops to be sensed, and the spots cover a sufficient fraction of the sensor area that a random coverage of water drops covering one to five percent of the sensor area is sufficient to close the circuit.

9. A windshield wiper control system as defined in claim 7 wherein a thin glass coupon is affixed by adhesive to the window area and the electrodes and conductive spots are on the surface of the coupon.

10. A windshield wiper control system for actuating wipers to wipe a window area in response to precipitation on the window, comprising;
    a precipitation sensor having at least three spaced elongated electrodes defining a plurality of inter-electrode spaces, each electrode comprising thin film transparent conductive material on the window area, and an array of thin film transparent conductive spots on the window between the electrodes, the spots being arranged to define an open circuit between the electrodes when the window is dry and a closed circuit between a set of electrodes when at least some of the spots are bridged by water drops, the electrodes being arranged to provide spaces between the electrodes of different shapes so that the spaces have different percolation thresholds and thus different sensitivities to precipitation, and
    a wiper control circuit for actuating wipers when the circuit is closed including a manually controlled switch coupled to the sensor electrodes for selecting a desired sensor sensitivity.

11. A windshield wiper control system for actuating wipers to wipe a window area in response to precipitation on the window, comprising;
    a precipitation sensor having a pair of spaced elongated electrodes of thin film transparent conductive material on the window area, the space between the electrodes comprising the sensor area, the sensor area comprising a plurality of strip regions each expending from one electrode to the other, and an array of thin film transparent conductive spots on the window between the electrodes, the spots being arranged to define an open circuit between the electrodes when the window is dry and a closed circuit when at least some of the spots are bridged by water drops, the conductive spots in each region being different in size from the spots in the other regions and the spots in each region being comparable in size to water drops to be sensed, whereby the system responds to precipitation of different types which are characterized by different drop sizes, and a wiper control circuit coupled to the precipitation sensor for actuating wipers when the circuit is closed to wipe the area covered by the sensor.

* * * * *